United States Patent
Stanasolovich et al.

(10) Patent No.: US 9,450,961 B2
(45) Date of Patent: Sep. 20, 2016

(54) MECHANISM FOR FACILITATING DYNAMIC ADJUSTMENTS TO COMPUTING DEVICE CHARACTERISTICS IN RESPONSE TO CHANGES IN USER VIEWING PATTERNS

(71) Applicants: David Stanasolovich, Corrales, NM (US); Joshua Boelter, Portland, OR (US); Don G. Meyers, Rescue, CA (US); Sudip S. Chahai, Gold River, CA (US)

(72) Inventors: David Stanasolovich, Corrales, NM (US); Joshua Boelter, Portland, OR (US); Don G. Meyers, Rescue, CA (US); Sudip S. Chahai, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 14/129,959

(22) PCT Filed: Aug. 30, 2013

(86) PCT No.: PCT/US2013/057656
§ 371 (c)(1),
(2) Date: Dec. 28, 2013

(87) PCT Pub. No.: WO2015/030814
PCT Pub. Date: Mar. 5, 2015

(65) Prior Publication Data
US 2015/0067787 A1    Mar. 5, 2015

(51) Int. Cl.
*G06F 21/00* (2013.01)
*H04L 29/06* (2006.01)
*G06F 3/00* (2006.01)
*G06F 21/31* (2013.01)
*G06F 21/32* (2013.01)

(52) U.S. Cl.
CPC ............... *H04L 63/10* (2013.01); *G06F 3/00* (2013.01); *G06F 21/316* (2013.01); *G06F 21/32* (2013.01); *H04L 63/08* (2013.01); *G06F 2221/2103* (2013.01)

(58) Field of Classification Search
None
See application file for complete search history.

(56) References Cited

U.S. PATENT DOCUMENTS

| | | |
|---|---|---|
| 6,094,185 A | 7/2000 | Shirriff |
| 2008/0130958 A1* | 6/2008 | Ziomek ............ G06K 9/00825 382/116 |
| 2009/0150006 A1 | 6/2009 | Albouyeh et al. |
| 2010/0328317 A1 | 12/2010 | Lindfors |
| 2012/0221475 A1* | 8/2012 | Grigg et al. .................. 705/67 |
| 2013/0028443 A1* | 1/2013 | Pance et al. ................. 381/107 |

OTHER PUBLICATIONS

PCT/US2013/057656 "Notification of Transmittal of the International Search Report and the Written Opinion of the International Searching Authority, or the Declaration" mailed May 30, 2014, pp. 11.

* cited by examiner

*Primary Examiner* — Hadi Armouche
*Assistant Examiner* — Andrew Steinle
(74) *Attorney, Agent, or Firm* — Blakely, Sokoloff, Taylor & Zafman LLP

(57) ABSTRACT

A mechanism is described for facilitating dynamic adjustments to features of computing devices according to one embodiment. A method of embodiments, as described herein, includes automatically monitoring usage patterns relating to a user of computing device. The usage patterns may be based on audio user characteristic or visual user characteristics relating to usage of the computing device. The method may further include automatically monitoring environment patterns relating to the usage of the computing device. The environment patterns may be based on surrounding environment having the user and the computing device. The method may further include facilitating dynamic adjustment of one or more features of the computing device based on one or more of the usage patterns, environment patterns, and user preferences.

20 Claims, 4 Drawing Sheets

MECHANISM FOR FACILITATING DYNAMIC ADJUSTMENTS TO COMPUTING DEVICE CHARACTERISTICS IN RESPONSE TO CHANGES IN USER VIEWING PATTERNS

CROSS-REFERENCE TO RELATED APPLICATION

This patent application is a U.S. National Phase Application under 35 U.S.C. §371 of International Application No. PCT/US2013/57656, filed Aug. 30, 2013, entitled MECHANISM FOR FACILITATING DYNAMIC ADJUSTMENTS TO COMPUTING DEVICE CHARACTERISTICS IN RESPONSE TO CHANGES IN USER VIEWING PATTERNS by David Stanasolovich, et al., the benefit and priority are claimed thereof and the entire contents of which are incorporated herein by reference.

FIELD

Embodiments described herein generally relate to computer programming. More particularly, embodiments relate to a mechanism for facilitating dynamic adjustments to computing device characteristics in response to changes in user viewing patterns.

BACKGROUND

As human beings, it is natural for users of computing devices to constantly change their viewing behaviors based on any number of factors, such as eye strength, health, presences and type of eye glasses, lighting/brightness, font size, distance between a user and a computing device, etc. However, any change in the user's viewing behavior leads to the user having to manually adjust one or more viewing characteristics (e.g., move the computing device closer, change the font size, etc.) of the computing device to adjust it to the change in the user's viewing behavior or alternatively, further change the user's own viewing behavior (e.g., get closer to the computing device, squinting of the eyes, etc.). Such manual adjustments are not only burdensome and inefficient, but also prone to human error and sometimes, unachievable.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for detecting, learning, and managing technical features and usage behaviors of computing devices, viewing patterns and usage preferences of users, and appearances and characteristics of the surrounding usage environment to be used to facilitate automatic and dynamic adjustments to the computing devices features/characteristics corresponding to any modifications in the usage patterns/preferences and/or changes in the surrounding environment.

For example and in one embodiment, various detection devices (e.g., cameras, listeners, recorders, etc.), pattern recognition techniques (e.g., hidden Markov model (HMM), etc.), context-aware, location-aware, predictability, connectivity, proximity, and location management techniques (e.g., Intel®'s Common Connectivity Framework (CCF), "BLUETOOTH", BLUETOOTH low energy (BLE) or BLUETOOTH Smart, Wi-Fi proximity, Radio Frequency Identification (RFID), geo-fencing, Location-Based Service (LBS), Virtual Private Network (VPN), etc.) may be used and applied as appropriate and based on, for example, user and/or device activities and behavior, history of user and/or device activities and behavior, nature and frequency of a change in activity/behavior, type of device (e.g., a smartphone versus a dumb phone, a desktop computer versus a laptop computer, etc.), proximity/distance between devices, (e.g., a few feet versus several thousand miles, etc.), etc. It is to be noted that embodiments are not limited to any particular technique or solution. It is to be further noted that the use of certain names or terms, such as "Common Connectivity Framework", "CCF", "BLUETOOTH", "hidden Markov model", visual learning platform", etc., should not be read to limit embodiments to software or devices that carry that label in products or in literature external to this document.

Figure 1:
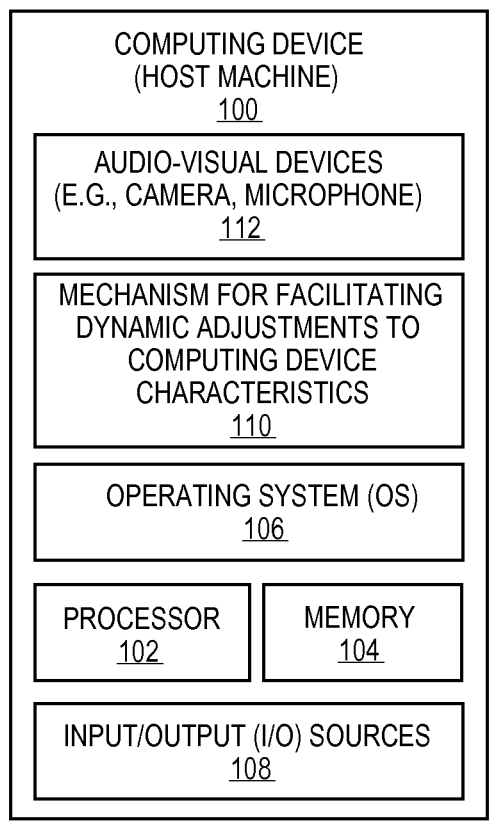
FIG. 1 illustrates a mechanism for facilitating dynamic adjustments to computing device characteristics employed at a computing device according to one embodiment.

FIG. 1 illustrates a mechanism for facilitating dynamic adjustments to computing device characteristics 110 employed at a computing device 100 according to one embodiment. Computing device 100 serves as a host machine for facilitating dynamic adjustments to computing device characteristics ("dynamic adjustment mechanism") 110 in response to any detected or reported changes to user viewing patterns or the environmental characteristics. In one embodiment, dynamic adjustment mechanism 110 includes various components for continuously monitoring, learning, and interpreting user patterns and preferences, environmental characteristics, and any features relating to computing device 100 and any number type of other computing devices, etc., for facilitating dynamic adjustments to various characteristics and setting of computing device 100.

For example, any number of usage patterns and/or preferences may be detected and interpreted, such as the user's eye strength and health, presence and type of eyeglasses, ambient lighting, duration of viewing the display screen, type and density of content being viewed, font size of the print being viewed, 3-dimensional position of the user's eye relative to the display screen, display brightness, type of display being viewed, room temperature, background noises, etc. In one embodiment, such patterns may be monitored as well as changes to them by dynamic adjustment mechanism 110 and appropriate changes may be dynamically made to computing device 100 to provide a seamless usage experience for the user.

Computing device 100 may further include any number and type of audio-visual devices 112, such as camera, microphone, speakers, etc. Computing device 100 may include mobile computing devices, such as cellular phones including smartphones (e.g., iPhone® by Apple®, Black-Berry® by Research in Motion®, etc.), personal digital assistants (PDAs), etc., tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "host", "server", "memory server", "machine", "device", "computing device", "computer", "computing system", and the like, may be used interchangeably throughout this document.

Figure 2:
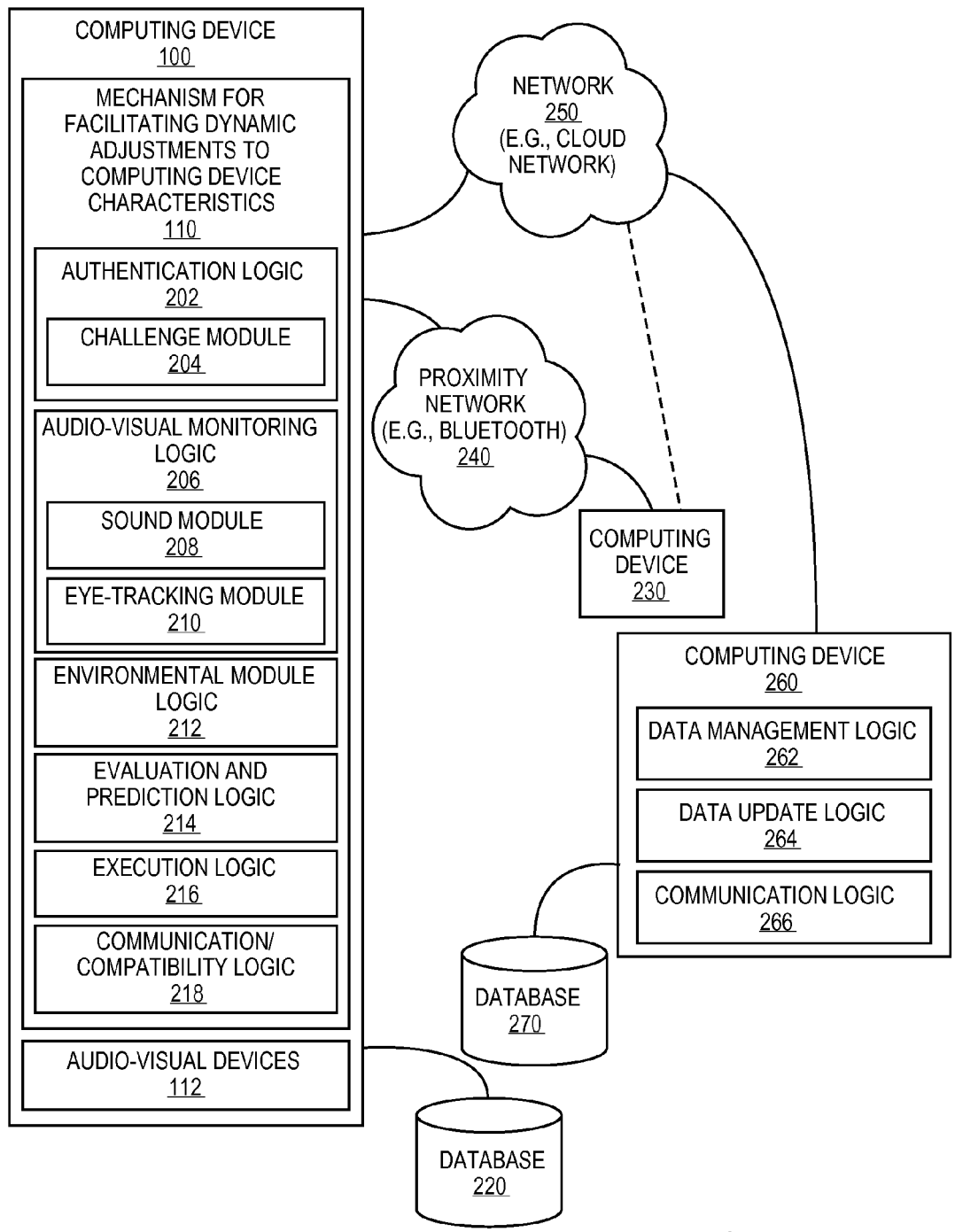
FIG. 2 illustrates a mechanism for facilitating dynamic adjustments to computing device characteristics according to one embodiment.

FIG. 2 illustrates a mechanism for facilitating dynamic adjustments to computing device characteristics 110 according to one embodiment. In one embodiment, dynamic adjustment mechanism 110 includes a number of components, such as authentication logic 202 having a challenge module 204, audio-visual monitoring logic 206 having a sound module 208 and an eye tracking module 210, environment monitoring logic 212, evaluation and prediction logic 214, execution logic 216, and communication/compatibility logic 218. In one embodiment, dynamic adjustment mechanism 110 may be in communication with one or more audio-visual devices 112, such as a camera, a microphone, a speaker, etc., of the host machine, such as computing device 100.

In one embodiment, authentication logic 202 may be used to perform an authentication process to confirm or deny one or more users attempting to access computing device 100. In one embodiment, authentication logic 202 may maintain a user profile associated the user authorized to access computing device 100 and the user profile may then be used to authenticate the user and deny access to other unknown users attempting to access computing device 100. It is contemplated that more than one user may be authorized to access computing device 100. For example and in one embodiment, each time a user attempts to access computing device 100, authentication logic 202 refers to the user profile and, depending on the security level set by the user, challenge module 204 may challenge the attempting user to respond to one or more probing questions, such as "what is the name of the last file saved?", "what is the name of the city of your birth?", "what is the name of your immediate supervisor?", etc., if the security level is set at "low". Upon correctly answering the one or more questions, the user may be allowed to access computing device 100.

In another embodiment, the authorized user may set the security level to be "moderate" or "high" which may lead challenge module 204 to challenge the attempted user to pass other, more difficult, security measures. For example, challenge module 204 may work with one of audio-visual devices 112 to verify the attempting user, such as using a camera to look at the attempting user's face or facial features (e.g., eyes, distance between the eyes, nose, etc.) to match against the user data of the user profile on file. Similarly, other biometric techniques (e.g., fingerprints, etc.) may be used to verify the attempting user to provide as high a security as desired by the user or necessitated.

In one embodiment, dynamic adjust mechanism 110 provides for an opt-in offer to the user of computing device 100 to be a participant by registering with and getting authenticated by authentication logic 202. Once authenticating and registering the user, audio-visual monitoring logic 206 may be used to monitor and learn the user's viewing patterns for display screen associated with computing device 100. Further, the user may be allowed to provide own viewing preferences that are also then monitored by audio-visual monitoring logic 206, evaluated by evaluation and prediction logic 214, and applied, by execution logic 216, to the existing usage patterns to continue to provide seamless, customized, and dynamic viewing and listening experience to the user.

In one embodiment, sound module 208 and eye tracking module 210 of audio-visual monitoring logic 206 may facilitate one or more audio-visual devices 112 (e.g., camera, microphone, etc.) to monitor (e.g., view, listen, detect, etc.) various usage patterns of the user, such as a camera may be used to detecting whether the user wears reading glasses or request magnification, viewing angle of the user, distance the user keeps from the display screen, etc. Similarly, a facial recognition technique may be used with the camera to detect facial characteristics of the user, etc. Further, for example, eye tracking module 210 may facilitate the camera of audio-visual devices 112 to specifically detect the user's eyes and their movement, such as the font size of the text that is being displayed at which user's eyes appear and/or behave normal, whether the user wears eyeglasses and are they removed upon occurrence of certain events (such as when the display light and/or the font size is changed or upon reaching a certain time period (e.g., every half hour, etc.), whether the user rubs eyes and how frequently, the longest time period the user views the display screen without interruption, etc.

In one embodiment, the aforementioned detected user characteristics may be evaluated and interpreted by evaluation and prediction logic 214 to determined usage patterns (e.g., font size 10 is regarded as small for the user because the user consistently increases it to size 12) that are then used to perform dynamic adjustment to the behavior or various features of computing device 100, such as automatically and dynamically adjusting the font size of the display. In another embodiment, usage patterns may be interpreted not only from the detected user characteristics, but also from user preferences that are explicitly provided by the user for dynamic adjustment mechanism 110 to consider and apply. For example, using the font example, the user may set the font preference to size 12 which may then be taken into consideration by evaluation and prediction logic 214 when evaluating or interpreting for usage patterns and execution logic 216 when executing the evaluated or interpreted usage patterns to achieve any number and type of dynamic adjustments to various features of computing device 100.

In one embodiment, any number and type of identifying characteristics of the user may be detected, using one or more facial tracking techniques along with sound and eye-tracking modules 208, 210 of audio-visual logic and one or more of audio-visual devices 112, to be used for security and authentication purposes. For example, the camera of audio-visual devices 112 may be used to detect various identifying visual characteristics associated with the user, such as distance between eyes, hair color, hair style, facial hair style (e.g., moustache, beard, etc.), eye color, identifying/birth marks (e.g., mole, etc.), etc. Similarly, for example, the microphone of audio-visual devices 112 may be used to detect various identifying audio characteristics associated with the user, such as voice tone, voice pitch, accent, spoken language/languages, consistent background music, noise/sounds (e.g., kids' noise in the background, dog barking, randomly, consistently or habitually spoken words (e.g., saying "great!" upon finishing certain projects), etc.), etc. Such identifying characteristics or patterns may be used to continuously advance and strengthen the security system. For example, a user request to access computing device 100 or any file or document on computing device 100 is detected by authentication logic 202, challenge module 204 may be triggered to facilitate the camera of audio-visual devices 112 to detect the attempting user's eye color or identifying facial mark for authentication purposes.

In one embodiment, environment monitoring logic 212 may be used to monitor the environment surrounding the user when accessing computing device 100 and detect any changes to the surrounding environment (e.g., room lighting being high or low, windows being open or closed, wall color, etc.). It is contemplated that certain changes to the surrounding environment (e.g., change in room lighting, being indoor versus outdoor, etc.) may have an impact on, for example, how the user views a display screen. Accordingly, in one embodiment, monitored information, including detected changes, relating to the surrounding environment may forwarded on from environment monitoring logic 212 to evaluation and prediction logic 214 for further evaluation and then on to execution logic 216 for application of the evaluated data to facilitate dynamic adjustments to various features of computing device 100, such as dynamic adjusting the ambient light, turn on or off external display features, etc.

It is contemplated that the dynamic adjustments may not be limited to merely a one-time adjustment to a particular feature of computing device 100 but that in one embodiment, any one or more features of computing device 100 may be dynamically adjusted on a continuous or periodic basis as desired or necessitated. For example, upon detecting the user's long and continuous viewing of the display screen, the text, graphics, etc., provided on the display screen may be continuously or periodically magnified in response to the tiring of the eyes that the user may experience. In one embodiment, the total usage/viewing time and the tiring of the user's eyes may be monitored and detected by audio-visual monitoring logic 206 while, in another embodiment and for example, the tiring of the eyes may be predicted by evaluation and prediction logic 214 based on previously-detected usage patterns and/or per the usage preferences provided by the user.

For example, the camera may continuously record and learn the user's facial characteristics in a variety of positions and situations at different times of day or week, etc., and during any number and type of situations (e.g., vacation, weekdays, etc.), etc., which may then be used by dynamic adjustment mechanism 110 to automatically and dynamically adjust, for example, the display characteristics of computing device 100 to correspond to, for example, the user's specific viewing styles or positions being used, duration of viewing, time of day, type of content being viewed by the user, etc.

In one embodiment, during the daily learning period, audio-visual monitoring logic 206 may monitor and record the user's viewing style and pattern (e.g., reading glasses, magnification, viewing angle, distance from screen, font size, other display characteristics, etc.) as a function of duration and time of day, specific type of content being viewed, etc. As aforementioned, audio-visual monitoring logic 206 may further monitor and record, for example, the user's facial characteristics in parallel with the viewing characteristics and similarly, environment monitoring logic 212 may monitor and record specifics and certain features relating to user's surrounding environment (e.g., wall/background color, the user is indoors or outdoors, cloudy or sunny outside, indoor lighting, etc.). Additionally, the user may choose to explicitly input, using a user interface, certain usage preferences, requirements, etc., so, these preferences may also be considered by evaluation and prediction logic 214.

In one embodiment, evaluation and prediction logic 214 may use any number and type of techniques and algorithms (e.g., pattern recognition techniques, such as hidden Markov models, etc.) to predict the specific viewing styles that the user may prefer or require throughout the day as and based on, for example, a function of the duration of usage, presence or absence of reading glasses, position relative to the display screen, specific type of content being displayed, current content (e.g., email, etc.) being displayed, type of display device, etc.

Further, in one embodiment, the user of computing device 100 (e.g., desktop computer, tablet computer, etc.), may choose to carry or export any amount and type of data relating to usage pattern being maintained at database 220 to another computing device 230 (e.g., laptop computer, smartphone, etc.) having dynamic adjustment mechanism 110. For example, the user may have multiple computing devices 100, 230 and, in one embodiment, may choose to transfer data relating to usage pattern from one computing device 100 (e.g., desktop computer, etc.) to other computing devices, such as computing device 230 (e.g., mobile computing device, such as a tablet computer, smartphone, etc.). Upon completing the usage pattern data transfer, computing device 230 receiving the data may automatically adopt the display and other characteristics of computing device 100 and function accordingly, such as similarly perform dynamic adjustments to various features of computing device 230. It is contemplated that the receiving computing device also employs dynamic adjustment mechanism 110. The transfer may be performed over proximity network 240 (e.g., BLUETOOTH, etc.) if computing devices 100, 230 are within an allowable/acceptable proximity/distance (e.g., a few feet) of each other. If computing devices 100, 230 are outside the allowable/acceptable proximity, the transfer may be performed over network 250 (e.g., cloud network, the Internet, etc.). Further, communication with computing device 230 may be facilitated using communication/compatibility logic 216.

In one embodiment, computing device 100 may be in communication with computing device 260 (e.g., server computing device) over network 250 where computing device 260 may include data management logic 262, data update logic 264, and communication logic 266. The usage pattern data may be transferred from computing device 100 to computing device 260, via communication/compatibility logic 216 and communication logic 266, over network 250. In one embodiment, computing device 260 may include a cloud-based server computing device to be used to maintain usage pattern data via data management logic 262. The usage pattern data being maintained at computing device 260 may be stored at database 270 and communicated with or exported back to computing devices 100, 230 or transferred to a new computing device (not shown) as desired or necessitated (e.g., emergency), such as in case of the usage pattern data loss at one or both of computing devices 100, 230 or the loss of one or both of computing devices 100, 230. Any form of data update or upgrade (e.g., updating dynamic adjustment mechanism 110) may be performed at computing devices 100, 230 via data update logic 264. Communication between commuting devices 100, 230, 260 may be facilitated by communication logic 266 over network 250.

Communication/compatibility logic 216 may be used to facilitate dynamic communication and compatibility between various computing devices, such as computing devices 100, 230 (e.g., mobile computing device), computing device 260 (e.g., server computing device), etc., databases and storage devices, such as databases 220, 270, networks, such as network 250 (e.g., cloud network, the Internet etc.) and proximity network 240 (BLUETOOTH, BLE, Wi-Fi proximity, etc.), etc., software applications/websites, (e.g., social networking websites, such as Facebook®, LinkedIn®, Google+®, etc., business applications, games and other entertainment applications, etc.), programming languages, etc., while ensuring compatibility with changing technologies, parameters, protocols, standards, etc.

It is contemplated that any number and type of components may be added to and/or removed from dynamic adjustment mechanism 110 to facilitate various embodiments including adding, removing, and/or enhancing certain features. For brevity, clarity, and ease of understanding of dynamic adjustment mechanism 110 and many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
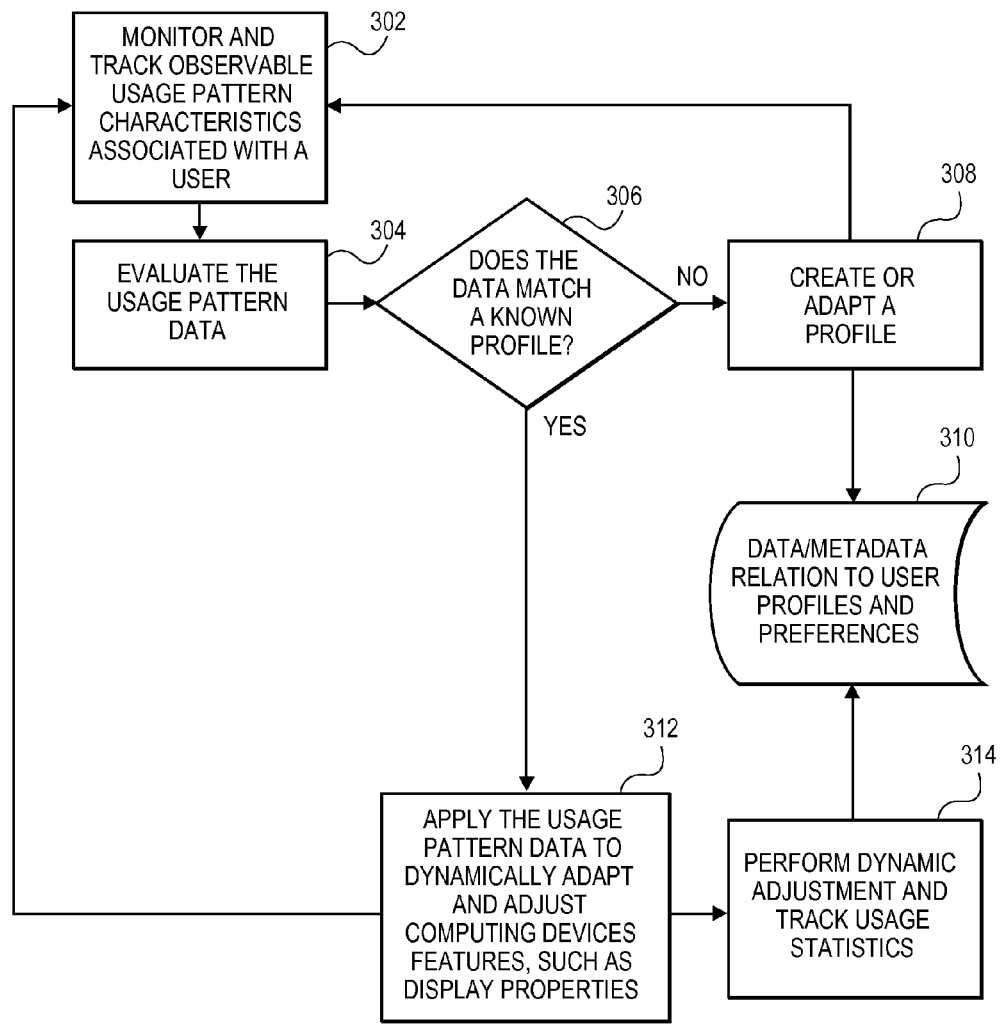
FIG. 3 illustrates a method for facilitating dynamic adjustment of computing device characteristics according to one embodiment.

FIG. 3 illustrates a method 300 for facilitating dynamic adjustment of computing device characteristics according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by dynamic adjustment mechanism 110 of FIG. 1.

Method 300 begins at block 302 with monitoring, detecting, and tracking of observable usage pattern characteristics associated with a user of a computing device. At block 304, the monitored usage pattern data is evaluated. At block 306, a determination is made as to whether the usage pattern data machine any of the existing user profiles. If not, at block 308, a new user profile is created and associated with the user. However, at block 312, if the usage pattern data matches an existing user profile associated with the user, the usage pattern data is applied to dynamically adapt and adjust various features of the computing device, such as display properties (e.g., zoom, contrast, refresh rate, backlight, font, etc.). The adjustments are dynamically made and they continue as the newly-monitored user pattern data and/or user preferences come available while user statistics relating to the adjustments are recorded at block 314 and made part of data/metadata relating to user profiles and preferences at block 310.

Figure 4:
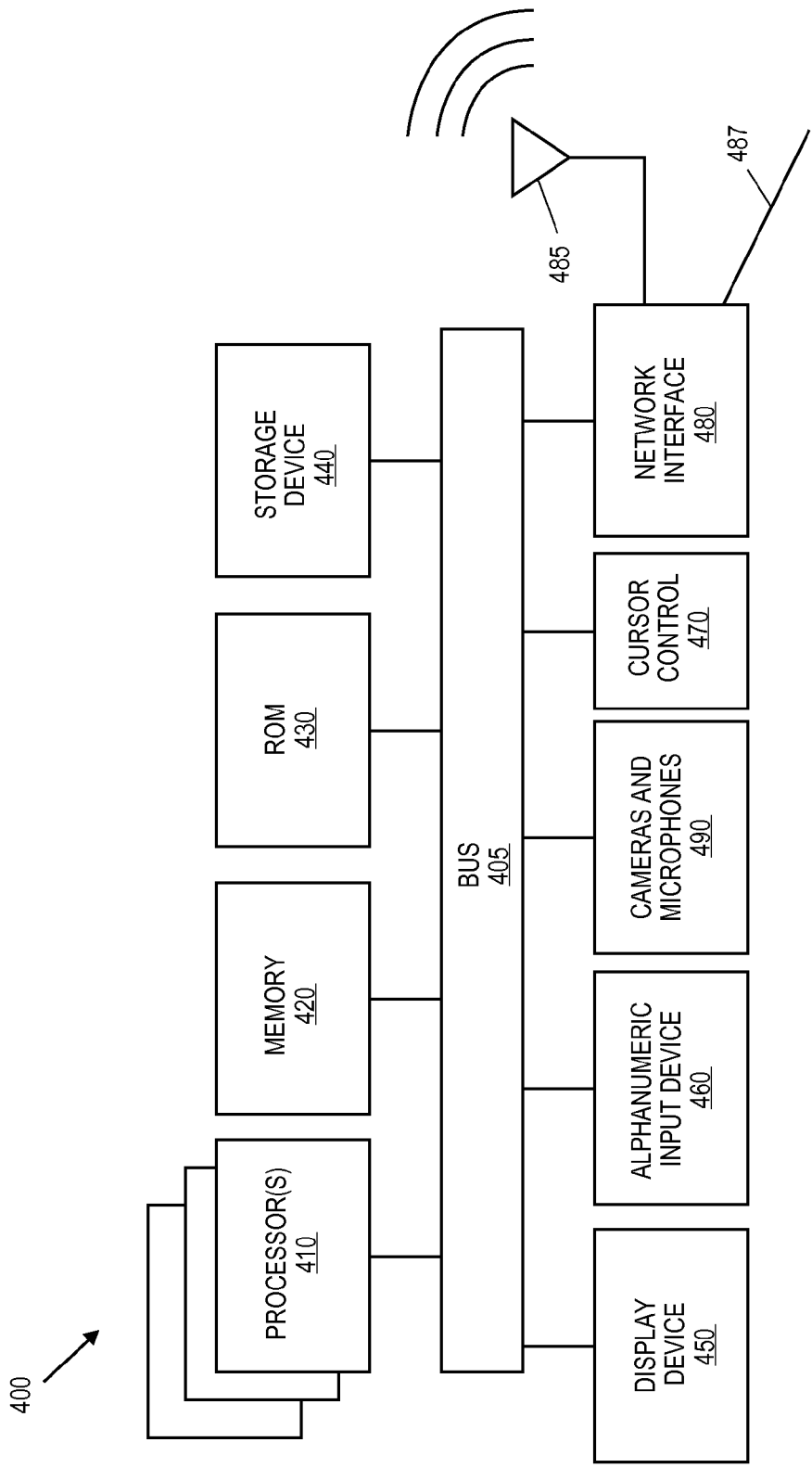
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100, employing dynamic adjustment mechanism 110, of FIG. 1.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), BLUETOOTH, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to BLUETOOTH standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: automatically monitoring usage patterns relating to a user of computing device, wherein usage patterns are based on audio user characteristic or visual user characteristics relating to usage of the computing device; automatically monitoring environment patterns relating to the usage of the computing device, wherein the environment patterns are based on surrounding environment having the user and the computing device; and facilitating dynamic adjustment of one or more features of the computing device based on one or more of the usage patterns, environment patterns, and user preferences.

Embodiments or examples include any of the above further comprising monitoring, via a sound module, the audio user characteristics including one or more of voice tone of the user, voice pitch of the user, accent of the user, and language being used by the user.

Embodiments or examples include any of the above further comprising monitoring, via an eye tracking module, first visual characteristics relating to eyes of the user, wherein the first visual characteristics include one or more of distance between the eyes, movement of the eyes, color of the eyes, blinking of the eyes, dilation of the eyes, and squinting of the eyes.

Embodiments or examples include any of the above further comprising monitoring, via a camera, second visual characteristics relating to face or hair of the user, wherein the second visual characteristics include one or more of facial expression of the user, skin tone, facial symmetry, distance between ears, facial marks, facial hair, hair color, and hair style.

Embodiments or examples include any of the above wherein the environment patterns comprise one or more of indoor setting characteristics or outdoor setting characteristics, wherein the indoor setting characteristics include size of a room having the user and the computing device, wall colors of the room, lighting of the room, noise level in the room, movement within or around the room, and distinct features of the room, and wherein the outdoor setting characteristics include natural or artificial features within or near an outdoor area, level of natural or artificial lighting within or near the outdoor area, level or noise level within or near the outdoor area, and movement within or near the outdoor area.

Embodiments or examples include any of the above further comprising evaluating the usage patterns or environment patterns to determine the one or more features of the computing device that are to be dynamically adjusted.

Embodiments or examples include any of the above further comprising predicting the one or more features based on the user preference and at least one of the usage patterns and environment patterns.

Embodiments or examples include any of the above further comprising authenticating the user or one or more other users prior to authorizing access to the computing device, wherein authenticating further comprises challenging the user or the one or more other users for authentication purposes, wherein the challenge includes performing one or more of asking a set of questions or verifying the user and the one or more other users based on the first visual characteristics or the second visual characteristics.

Embodiments or examples include any of the above further comprising communicating one or more of the usage patterns, the environment patterns, and the user preferences to a client computing device over a network including a proximity network having a BLUETOOTH connection, and wherein the network includes a cloud network.

Embodiments or examples include any of the above further comprising: communicating one or more of the usage patterns, the environment patterns, and the user preferences to a server computing device over a network including the cloud network; and facilitating the server computing device to maintain and store the usage patterns, the environment patterns, and the user preferences at a database coupled to the server computing device, wherein maintaining includes providing data updates to one or more of the usage patterns, the environment patterns, and the user preferences, and software updates to relevant software applications.

Another embodiment or example incudes an apparatus to carry out operations according to any of the methods mentioned above.

In another embodiment or example, an apparatus comprises means for carrying out operations according to any of the methods mentioned above.

In yet another embodiment or example, a computing device arranged to carry out operations according to any of the methods mentioned above.

In yet another embodiment or example, a communications device arranged to carry out operations according to any of the methods mentioned above.

In one embodiment or example, a system comprises a mechanism to carry out operations according to any of the methods mentioned above.

In yet another embodiment or example, at least one machine-readable storage medium comprising a plurality of instructions that in response to being executed on a computing device, causes the computing device to carry out operations according to any of the methods mentioned above.

In yet another embodiment or example, at least one non-transitory or tangible machine-readable storage medium comprising a plurality of instructions that in response to being executed on a computing device, causes the computing device to carry out operations according to any of the methods mentioned above.

Some embodiments pertain to an apparatus comprising: audio-visual monitoring logic to automatically monitor usage patterns relating to a user of computing device, wherein usage patterns are based on audio user characteristic or visual user characteristics relating to usage of the computing device; environment monitoring logic to automatically monitor environment patterns relating to the usage of the computing device, wherein the environment patterns are based on surrounding environment having the user and the computing device; and execution logic to facilitate dynamic adjustment of one or more features of the computing device based on one or more of the usage patterns, environment patterns, and user preferences.

Embodiments or examples include the above apparatus wherein the audio-visual monitoring logic comprises a sound module to monitor the audio user characteristics including one or more of voice tone of the user, voice pitch of the user, accent of the user, and language being used by the user.

Embodiments or examples include the above apparatus wherein the audio-visual monitoring logic further comprises an eye tracking module to monitor first visual characteristics relating to eyes of the user, wherein the first visual characteristics include one or more of distance between the eyes, movement of the eyes, color of the eyes, blinking of the eyes, dilation of the eyes, and squinting of the eyes.

Embodiments or examples include the above apparatus wherein the audio-visual monitoring logic is further to facilitate a camera at the computing device to monitor second visual characteristics relating to face or hair of the user, wherein the second visual characteristics include one or more of facial expression of the user, skin tone, facial symmetry, distance between ears, facial marks, facial hair, hair color, and hair style.

Embodiments or examples include the above apparatus wherein the environment patterns comprise one or more of indoor setting characteristics or outdoor setting characteristics, wherein the indoor setting characteristics include size of a room having the user and the computing device, wall colors of the room, lighting of the room, noise level in the room, movement within or around the room, and distinct features of the room, and wherein the outdoor setting characteristics include natural or artificial features within or near an outdoor area, level of natural or artificial lighting within or near the outdoor area, level or noise level within or near the outdoor area, and movement within or near the outdoor area.

Embodiments or examples include the above apparatus further comprising evaluation and prediction logic to evaluate the usage patterns or the environment patterns to determine the one or more features of the computing device that are to be dynamically adjusted.

Embodiments or examples include the above apparatus wherein the evaluation and prediction logic is further to predict the one or more features based on the user preference and at least one of the usage patterns and environment patterns.

Embodiments or examples include the above apparatus further comprising authentication logic to authenticate the user or one or more other users prior to authorizing access to the computing device, wherein the authentication logic comprises a challenge module to challenge the user or the one or more other users for authentication purposes, wherein the challenge includes performing one or more of asking a set of questions or verifying the user and the one or more other users based on the first visual characteristics or the second visual characteristics.

Embodiments or examples include the above apparatus further comprising communication/compatibility logic to communicate one or more of the usage patterns, the environment patterns, and the user preferences to a client computing device over a network including a proximity network having a BLUETOOTH connection, and wherein the network includes a cloud network, and wherein the communication/compatibility logic is further to communicate one or more of the usage patterns, the environment patterns, and the user preferences to a server computing device over a network including the cloud network.

Embodiments or examples include the above apparatus wherein the communication/compatibility logic is further to facilitate the server computing device to maintain and store the usage patterns, the environment patterns, and the user preferences at a database coupled to the server computing device, wherein maintaining includes providing data updates to one or more of the usage patterns, the environment patterns, and the user preferences, and software updates to relevant software applications.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a processing device and a storage device coupled to the processing device, wherein the processing device to facilitate
audio-visual monitoring logic to automatically monitor, in real-time, usage patterns relating to a user of computing device, wherein usage patterns are based on audio user characteristic or visual user characteristics relating to usage of the computing device, wherein monitoring of the usage patterns based on the visual user characteristics includes real-time detection of inconsistencies in one or more attributes of the user, wherein the one or more attributes include one or more of distance between eyes, hair style, hair color, facial hair, eye color, identifying marks, and external objects including eyewear;
environment monitoring logic to automatically monitor, in real-time, environment patterns relating to the usage of the computing device, wherein the environment patterns are based on surrounding environment having the user and the computing device;
evaluation and prediction logic to interpret, in real-time, at least one of the usage patterns and the environment patterns, wherein the evaluation and prediction logic is further to predict, in real-time, one or more adjustments to one or more features of the computing device based on user preferences and the real-time interpretation of at least one of the usage patterns and the environment patterns, wherein the one or more features include one or more of sound features, video features, textual features, graphics features, and wherein the one or more adjustments include altering one or more properties of the one or more features in anticipation of occurrence of future changes relating to at least one of the usage patterns and the environmental patterns; and
execution logic to dynamically facilitate, in real-time, the one or more adjustments to the one or more features of the computing device based on the real-time prediction of the one or more adjustments, wherein dynamically facilitating includes continuously triggering adjustments based on real-time interpretations and predictions.

2. The apparatus of claim 1, wherein the audio-visual monitoring logic comprises a sound module to monitor the audio user characteristics including one or more of voice tone of the user, voice pitch of the user, accent of the user, and language being used by the user.

3. The apparatus of claim 2, wherein the audio-visual monitoring logic further comprises an eye tracking module to monitor first visual characteristics relating to eyes of the user, wherein the first visual characteristics include one or more of distance between the eyes, movement of the eyes, color of the eyes, blinking of the eyes, dilation of the eyes, and squinting of the eyes.

4. The apparatus of claim 1, wherein the processing device to facilitate the audio-visual monitoring logic to facilitate a camera at the computing device to monitor second visual characteristics relating to face or hair of the user, wherein the second visual characteristics include one or more of facial expression of the user, skin tone, facial symmetry, distance between ears, facial marks, facial hair, hair color, and hair style.

5. The apparatus of claim 1, wherein the environment patterns comprise one or more of indoor setting characteristics or outdoor setting characteristics, wherein the indoor setting characteristics include size of a room having the user and the computing device, wall colors of the room, lighting of the room, noise level in the room, movement within or around the room, and distinct features of the room, and wherein the outdoor setting characteristics include natural or artificial features within or near an outdoor area, level of natural or artificial lighting within or near the outdoor area, level or noise level within or near the outdoor area, and movement within or near the outdoor area.

6. The apparatus of claim 1, wherein the processing device to facilitate the evaluation and prediction logic to evaluate the usage patterns or the environment patterns to determine the one or more adjustments or the one or more features of the computing device.

7. The apparatus of claim 1, wherein the processing device to facilitate authentication logic to authenticate the user or one or more other users prior to authorizing access to the computing device, wherein the authentication logic comprises a challenge module to challenge the user or the one or more other users for authentication purposes, wherein the challenge includes performing one or more of asking a set of questions or verifying the user and the one or more other users based on the first visual characteristics or the second visual characteristics.

8. The apparatus of claim 1, wherein the processing device to facilitate communication/compatibility logic to communicate one or more of the usage patterns, the environment patterns, and the user preferences to a client computing device over a network including a proximity network, and wherein the network includes a cloud network.

9. The apparatus of claim 8, wherein the processing device to facilitate the communication/compatibility logic to communicate one or more of the usage patterns, the environment patterns, and the user preferences to a server computing device over a network including the cloud network.

10. The apparatus of claim 8, wherein the processing device to facilitate the communication/compatibility logic to facilitate the server computing device to maintain and store the usage patterns, the environment patterns, and the user preferences at a database coupled to the server computing device, wherein maintaining includes providing data updates to one or more of the usage patterns, the environment patterns, and the user preferences, and software updates to relevant software applications.

11. A method comprising:
automatically monitoring, by a processing device, usage patterns relating to a user of computing device, wherein usage patterns are based on audio user characteristic or visual user characteristics relating to usage of the computing device;
automatically monitoring, in real-time, by the processing device, environment patterns relating to the usage of the computing device, wherein the environment patterns are based on surrounding environment having the user and the computing device, wherein monitoring of the usage patterns based on the visual user characteristics includes real-time detection of inconsistencies in one or more attributes of the user, wherein the one or more attributes include one or more of distance between eyes, hair style, hair color, facial hair, eye color, identifying marks, and external objects including eyewear;
interpreting, in real-time, at least one of the usage patterns and the environment patterns for predicting, in real-time, by the processing device, one or more adjustments to one or more features of the computing device based on user preferences and the real-time interpretation of at least one of the usage patterns and the environment patterns, wherein the one or more features include one or more of sound features, video features, textual features, graphics features, and wherein the one or more adjustments include altering one or more properties of the one or more features in anticipation of occurrence of future changes relating to at least one of the usage patterns and the environmental patterns; and
dynamically facilitating, in real-time, by the processing device, the one or more adjustments to the one or more features of the computing device based on the real-time prediction of the one or more adjustments, wherein dynamically facilitating includes continuously triggering adjustments based on real-time interpretations and predictions.

12. The method of claim 11, further comprising:
monitoring, by the processing device, via a sound module, the audio user characteristics including one or more of voice tone of the user, voice pitch of the user, accent of the user, and language being used by the user;
monitoring, by the processing device, via an eye tracking module, first visual characteristics relating to eyes of the user, wherein the first visual characteristics include one or more of distance between the eyes, movement of the eyes, color of the eyes, blinking of the eyes, dilation of the eyes, and squinting of the eyes; and
monitoring, by a camera, second visual characteristics relating to face or hair of the user, wherein the second visual characteristics include one or more of facial expression of the user, skin tone, facial symmetry, distance between ears, facial marks, facial hair, hair color, and hair style.

13. The method of claim 11, wherein the environment patterns comprise one or more of indoor setting characteristics or outdoor setting characteristics, wherein the indoor setting characteristics include size of a room having the user and the computing device, wall colors of the room, lighting of the room, noise level in the room, movement within or around the room, and distinct features of the room, and wherein the outdoor setting characteristics include natural or artificial features within or near an outdoor area, level of natural or artificial lighting within or near the outdoor area, level or noise level within or near the outdoor area, and movement within or near the outdoor area.

14. The method of claim 11, further comprising:
evaluating, by the processing device, the usage patterns or environment patterns to determine the one or more adjustments or the one or more features of the computing device; and
authenticating, by the processing device, the user or one or more other users prior to authorizing access to the computing device, wherein authenticating further comprises challenging the user or the one or more other users for authentication purposes, wherein the challenge includes performing one or more of asking a set of questions or verifying the user and the one or more other users based on the first visual characteristics or the second visual characteristics.

15. The method of claim 11, further comprising:
communicating, by the processing device, one or more of the usage patterns, the environment patterns, and the user preferences to a client computing device over a network including a proximity network, and wherein the network includes a cloud network;
communicating, by the processing device, one or more of the usage patterns, the environment patterns, and the user preferences to a server computing device over a network including the cloud network; and
facilitating, by the processing device, the server computing device to maintain and store the usage patterns, the environment patterns, and the user preferences at a database coupled to the server computing device, wherein maintaining includes providing data updates to one or more of the usage patterns, the environment patterns, and the user preferences, and software updates to relevant software applications.

16. At least one non-transitory machine-readable medium comprising a plurality of instructions that in response to being executed on a computing device, causes the computing device to carry out one or more operations comprising:
automatically monitoring, in real-time, usage patterns relating to a user of computing device, wherein usage patterns are based on audio user characteristic or visual user characteristics relating to usage of the computing device;
automatically monitoring, in real-time, environment patterns relating to the usage of the computing device, wherein the environment patterns are based on surrounding environment having the user and the computing device, wherein monitoring of the usage patterns based on the visual user characteristics includes real-time detection of inconsistencies in one or more attributes of the user, wherein the one or more attributes include one or more of distance between eyes, hair style, hair color, facial hair, eye color, indentifying marks, and external objects including eyewear;

interpreting, in real-time, at least one of the usage patterns and the environment patterns for predicting, in real-time, by the processing device, one or more adjustments to one or more features of the computing device based on user preferences and the real-time interpretation of at least one of the usage patterns and the environment patterns, wherein the one or more features include one or more of sound features, video features, textual features, graphics features, and wherein the one or more adjustments include altering one or more properties of the one or more features in anticipation of occurrence of future changes relating to at least one of the usage patterns and the environmental patterns; and dynamically facilitating, in real-time, by the processing device, the one or more adjustments to the one or more features of the computing device based on the real-time prediction of the one or more adjustments, wherein dynamically facilitating includes continuously triggering adjustments based on real-time interpretations and predictions.

17. The non-transitory machine-readable medium of claim 16, wherein the one or more operations further comprise:

monitoring, via a sound module, the audio user characteristics including one or more of voice tone of the user, voice pitch of the user, accent of the user, and language being used by the user;

monitoring, via an eye tracking module, first visual characteristics relating to eyes of the user, wherein the first visual characteristics include one or more of distance between the eyes, movement of the eyes, color of the eyes, blinking of the eyes, dilation of the eyes, and squinting of the eyes; and monitoring, via a camera, second visual characteristics relating to face or hair of the user, wherein the second visual characteristics include one or more of facial expression of the user, skin tone, facial symmetry, distance between ears, facial marks, facial hair, hair color, and hair style.

18. The non-transitory machine-readable medium of claim 16, wherein the environment patterns comprise one or more of indoor setting characteristics or outdoor setting characteristics, wherein the indoor setting characteristics include size of a room having the user and the computing device, wall colors of the room, lighting of the room, noise level in the room, movement within or around the room, and distinct features of the room, and wherein the outdoor setting characteristics include natural or artificial features within or near an outdoor area, level of natural or artificial lighting within or near the outdoor area, level or noise level within or near the outdoor area, and movement within or near the outdoor area.

19. The non-transitory machine-readable medium of claim 16, wherein the one or more operations further comprise:

evaluating the usage patterns or environment patterns to determine the one or more adjustments or the one or more features of the computing device that are to be dynamically adjusted; and authenticating the user or one or more other users prior to authorizing access to the computing device, wherein authenticating further comprises challenging the user or the one or more other users for authentication purposes, wherein the challenge includes performing one or more of asking a set of questions or verifying the user and the one or more other users based on the first visual characteristics or the second visual characteristics.

20. The non-transitory machine-readable medium of claim 16, wherein the one or more operations further comprise:

communicating one or more of the usage patterns, the environment patterns, and the user preferences to a client computing device over a network including a proximity network, and wherein the network includes a cloud network;

communicating one or more of the usage patterns, the environment patterns, and the user preferences to a server computing device over a network including the cloud network; and facilitating the server computing device to maintain and store the usage patterns, the environment patterns, and the user preferences at a database coupled to the server computing device, wherein maintaining includes providing data updates to one or more of the usage patterns, the environment patterns, and the user preferences, and software updates to relevant software applications.

* * * * *

UNITED STATES PATENT AND TRADEMARK OFFICE
CERTIFICATE OF CORRECTION

PATENT NO.         : 9,450,961 B2                                          Page 1 of 1
APPLICATION NO.    : 14/129959
DATED              : September 20, 2016
INVENTOR(S)        : Stanasolovich et al.

It is certified that error appears in the above-identified patent and that said Letters Patent is hereby corrected as shown below:

On the title page, at (71) Applicants: delete "Chahai" and insert --Chahal--.

On the title page, at (72) Inventors: delete "Chahai" and insert --Chahal--.

Signed and Sealed this
Eighth Day of November, 2016

Michelle K. Lee
*Director of the United States Patent and Trademark Office*